United States Patent [19]

Tannenbaum

[11] Patent Number: 5,326,960
[45] Date of Patent: Jul. 5, 1994

[54] CURRENCY TRANSFER SYSTEM AND METHOD

[76] Inventor: David H. Tannenbaum, 14860 Oaks North Pl., Addison, Tex. 75001

[21] Appl. No.: 981,813

[22] Filed: Nov. 25, 1992

[51] Int. Cl.$^5$ ............................................. G06F 15/30
[52] U.S. Cl. ..................... 235/379; 235/380; 235/381; 235/382.5; 902/40
[58] Field of Search .................. 902/40; 235/379, 380, 235/381, 382, 382.5

[56] References Cited

U.S. PATENT DOCUMENTS

| | | | |
|---|---|---|---|
| 4,007,355 | 2/1977 | Moreno | 235/379 |
| 4,542,465 | 9/1985 | Stockburger | 235/382 |
| 4,575,622 | 3/1986 | Pellegrini | 235/382 |
| 4,594,663 | 6/1986 | Nagata | 235/380 |
| 4,650,977 | 3/1987 | Couch | 235/381 |
| 4,764,666 | 8/1988 | Bergeron | 235/380 |
| 4,959,788 | 9/1990 | Nagata | 902/40 |
| 4,960,981 | 10/1990 | Benton | 235/379 |

OTHER PUBLICATIONS

NCR Temporary Copy of NDC+ Programmer's Overview ©1991 NCR Corporation.
NCR Temporary Copy of Programmer's Reference Manual ©1991 NCR Corporation.
NCR Temporary Copy of NDC+ Supervisor's Reference Manual ©1991 NCR Corporation.

*Primary Examiner*—Harold Pitts
*Attorney, Agent, or Firm*—Winstead Sechrest & Minick

[57] ABSTRACT

There is disclosed a currency transfer system and method which utilizes the existing ATM network but which provides for the temporary assignment of a PIN number and the temporary establishment of a credit limit within an existing account. Using the system a customer can, by using a temporary PIN at an ATM machine, withdraw an amount equal to or less than the temporary credit limit. In one embodiment, a depositing customer can establish the temporary credit limit by the transfer of funds from an existing account and in another embodiment the depositing customer can purchase temporary ATM cards which have contained within them programmed credit limits which are then read into the system under an assigned temporary PIN number.

29 Claims, 8 Drawing Sheets

FIG. 2
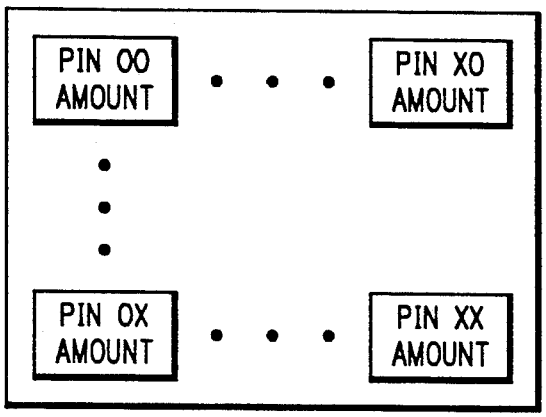
SPONSOR ACCOUNT A10
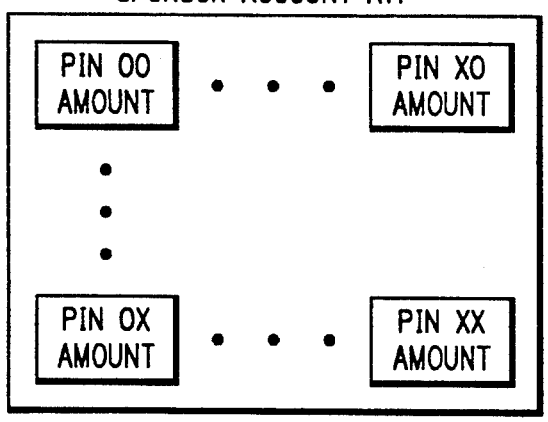
SPONSOR ACCOUNT A11
TOTAL BALANCE IN ACCOUNT A10 EQUALS
THE SUM OF SUB-ACCOUNTS 00 THRU XX
FIG. 4
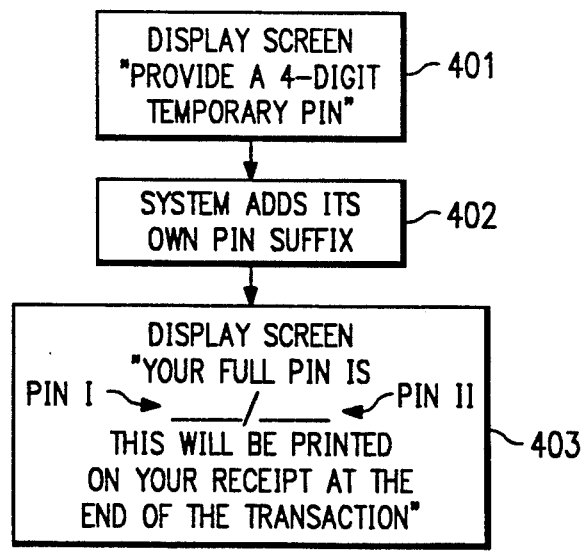

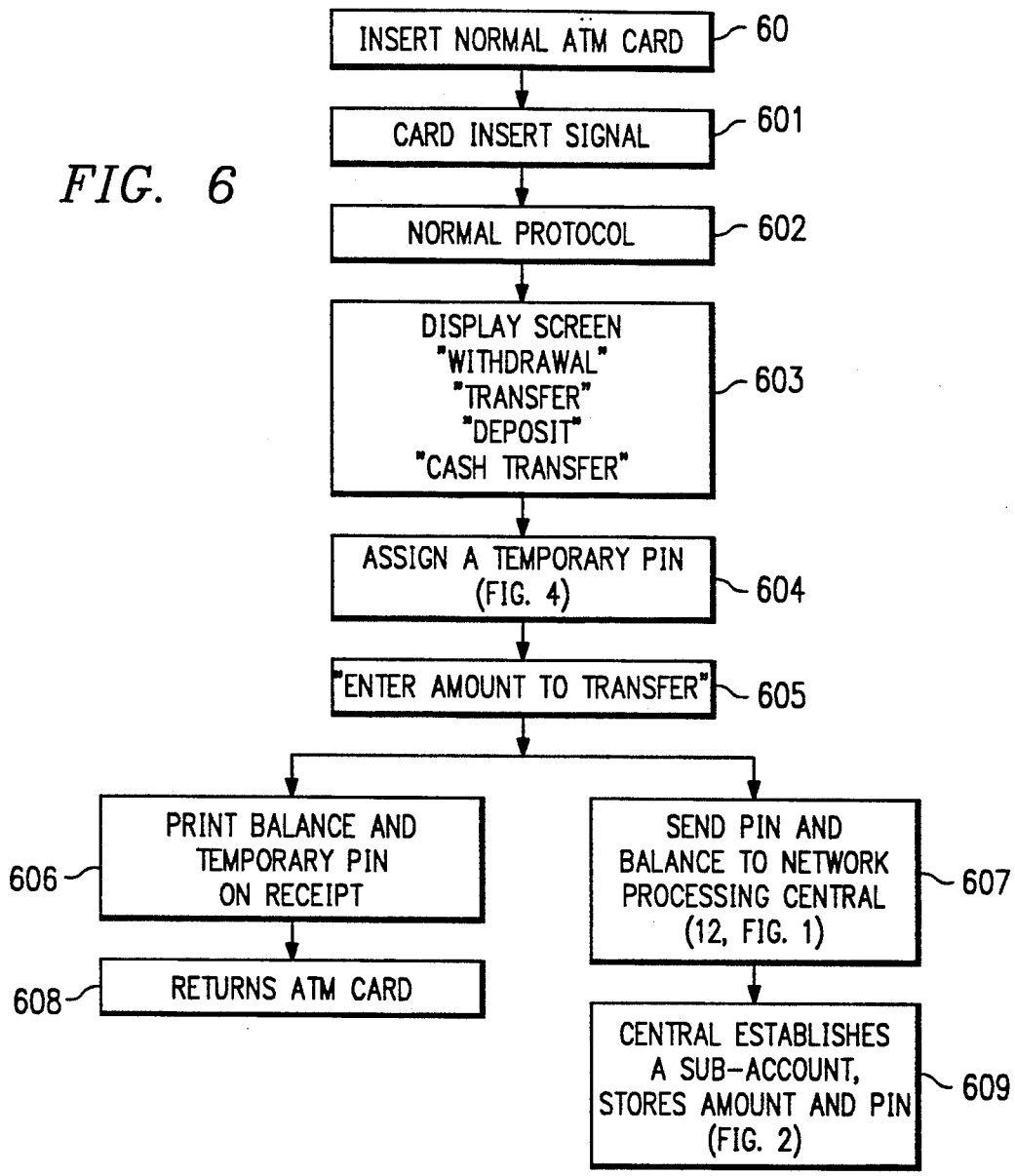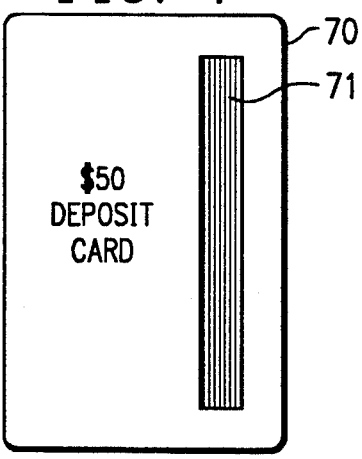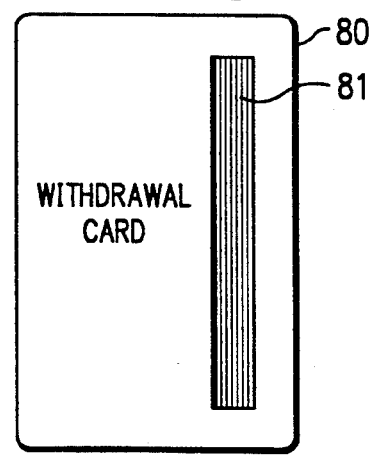

CURRENCY TRANSFER SYSTEM AND METHOD

TECHNICAL FIELD OF THE INVENTION

This invention relates to currency transfer systems and methods and more particularly to such systems and methods which allow one person not having a preestablished account to establish within a common account a specified sum of money which can then be removed at a later date either by the same person or by specific other people.

BACKGROUND OF THE INVENTION

The concept of using Automated Teller Machines (ATM's) has, in the past few years, become commonplace for the withdrawal of funds from a person's checking or savings account at any time, whether or not the bank is open or closed. Using an ATM, a person can even obtain cash from his or her credit card at any time of the day or night.

The several ATM systems in the USA, and indeed around the world, have been interlinked so that a person can travel to virtually any place and by inserting a card in an ATM machine and, supplying a preassigned Personal Identification Number (PIN) password, can request an amount of money from the account associated with the inserted card. Other transactions can also be performed during the same session, all by interaction with the ATM system.

In order to accomplish the desired transaction, the user enters numbers on a key pad, or pushes other buttons, all in response to displayed prompts. The prompts can be in English or in other languages selected by the user.

One basic concept of the present systems are that they require the user to have a preestablished account with a preissued card and with a preexisting PIN. The account can be a bank savings or checking account or can be a money market account or it can be a credit (or debit) card account, or it can be any one of a variety of other account types. With some of the accounts, the user already has an established sum of money in the account, and with others, the money is deposited (credited) when the user makes a withdrawal from the account.

One problem that the new system and method solves is based on the proposition that a particular user desires to transfer money to someone else (a child, for example) in a distant city where neither the user nor the child has an account.

A second problem that the new system solves supposes that the user does have an account which is accessible from an ATM machine but the child in the distant city does not have an ATM card for that account.

A third problem is presented by those who are traveling but do not wish to buy and carry travelers checks and also do not wish to carry large amounts of cash. This problem assumes the traveler does not have (and does not wish to establish) a preestablished ATM account. The existing ATM system does not presently solve any of these problems which are but a symptom of the more general problem of currency transfer. Today, in order to move currency from one place to another, the systems and methods do not differ much from those of many years ago. For example, a person can take cash to a wire transfer office (such as are maintained by Western Union) and have money wired to a wire transfer office in the city where the recipient is located. This supposes that one even knows where such offices are located and that the offices are open. Since emergencies do not obey 9 to 5 (or even 7 to midnight) hours, and since people without funds tend also to be without a means of transportation to get to the nearest wire transfer office (even assuming they could find one), the present wire transfer systems are, at best, cumbersome. These problems are compounded under the existing systems by time zone differences.

The cost to establish an electronic network similar to the existing ATM network is enormous. Thus, any solution to the problem must rely, to some extent, on the existing ATM network which does not, today, accommodate those without accounts and without valid ATM cards.

Accordingly, there is a need in the art for a currency transfer system which will allow any person to instantly and electronically transfer currency to any other person even if neither person has a preestablished account and even if neither person has a preissued ATM card.

A further need in the art is for a system which will allow for the instant transfer of currency between distant people without preestablished ATM accounts and ATM cards while still taking advantage of the existing ATM network.

SUMMARY OF THE INVENTION

The instant system contemplates at least one (but as will be seen there can be several) master accounts. This master account can be sponsored by a nationally known corporation (the sponsor) with retail outlets across the USA, or around the world. The sponsor can affiliate with other companies in the USA or in other countries to provide a world-wide network for the system. However, this is not necessary to the functioning of the system, and in fact the system will function so long as there is a large network of conveniently placed centers tied into the sponsoring master account. Existing ATM networks are acceptable.

The system and method operate as follows. A person desiring to send currency (the sender) goes to any sponsor's location and buys, for cash, or by using a credit card, a one-time ATM card. The card, in one embodiment, has a fixed amount of money associated therewith. For example, $50.00. In another embodiment, the store clerk programs the one-time ATM card to have whatever amount the sender wishes. Let us assume the first scenario (fixed amount of $50.00 per card) and the sender wishes to transfer $200.00. The sender gives the clerk $200.00 (cash or credit card) plus whatever fee is charged for the service. The clerk then hands the sender four ATM cards, each having the value of $50.00 preestablished thereon. The ATM card, or cards, allow the sender access (on a limited basis) to the sponsor's master account.

While not necessary, for security purposes, the one-time ATM cards can be limited for use only at the ATM machine local to the location where the cards were purchased.

The sender then inserts the first of the four cards into the ATM machine which recognizes the one-time nature of the card and switches to a special control program. This program knows that $50.00 is to be deposited into the master account. The system then asks the user to specify how many cards (or how much money) the user -wishes to link together into the newly created sub-account within the sponsor's account. The user answers the question and then inserts the other three cards.

The system creates a sub-account and assigns half of a PIN number to that sub-account. This half PIN number is given to the sender who is then asked to add the second half of the PIN number. It will be this full PIN number, both halves, that will allow the recipient access to the money in the sub-account.

The whole PIN number is printed on the receipt which the ATM provides to the sender and the ATM cancels the one-time ATM card. Any number of additional safeguards can be built into the system, such as, for example, the recipient's name (or state where the money will be removed) may be entered so that if someone were to find the password on the receipt that person would still not have enough information to gain access to the sponsor's sub-account.

The sender then telephones (or faxes) the recipient and communicates the password. The recipient then goes to the nearest sponsor's retail outlet, pays a small fee (or the fee could have been paid at the sending end) for a one-time ATM retrieval card. The one-time retrieval card is inserted in the ATM machine, the PIN password is given, and the recipient can then remove an amount of money up to the amount in the sub-account associated with the password. The normal daily limits for ATM withdrawals can be adhered to or waived, depending upon the system parameter.

In another embodiment, the ATM depositor could transfer an amount from an existing account, using his/her existing ATM card. In this scenario, the depositor would establish a transfer amount, and a temporary PIN. This amount would be available for a person using a retrieving ATM card and presenting the correct password (PIN).

From an operational point of view, the money can move into the sponsor's master account in a variety of ways. In one embodiment, the master account has an unlimited credit facility and daily settlements are made with a correspondent bank. The sponsor can presell the one-time ATM cards to each of the outlets in the same manner that other products are sold. Thus, a package of, say twenty ATM cards (each having a $50.00 value) can be sold for $1,000.00. Or, assuming the sponsor wishes to make money (say, $3.00 per ATM card) on the cards as they are sold to the individual retail outlets, then the package of twenty cards would sell for $1,060.00. The retail outlet then, in turn, could sell each card to the sender for a markup of, say, $2.00. The sender would then pay $55.00 for each $50.00 ATM card bought.

A system and method for using a card with a fixed amount of money thereon is shown in concurrently filed copending application entitled "Currency Transfer System and Method Using Fixed Limit Cards," Ser. No. 07/981,758, filed Feb. 17, 1993, in the names of Bill E. Brody and David H. Tannenbaum.

It is one feature of the invention that an ATM system is designed to accept an amount from a card and to accept a PIN number and to transmit the PIN number and the amount to a master account such that the amount can be removed by a person not previously having established an ATM account.

It is another feature of the invention that preprogrammed ATM cards can be bought by users at one location and these cards can be inserted into the ATM network such that the preprinted amounts on each card are transmitted to a central account allowing a recipient, using a temporarily assigned PIN number, access to the account for withdrawal of the transmitted amount.

It is a further feature of this invention that a user having an established ATM account with an established PIN number may transfer amounts (or have amounts set aside) so that a recipient, using a temporary PIN, can withdraw the amount so designated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 shows a representation of a series of sponsor accounts each having sub-accounts contained therein;

FIG. 4 is a flow chart showing the assignment of a temporary PIN having multiple portions;

FIG. 6 is a flow chart showing a system which allows for transfer from an existing account to a temporarily established account using a temporary PIN;

FIG. 7 shows a typical deposit card having magnetic stripe thereon;

FIG. 8 shows a typical withdrawal card having magnetic stripe thereon;

DETAILED DESCRIPTION OF THE INVENTION

Figure 1:
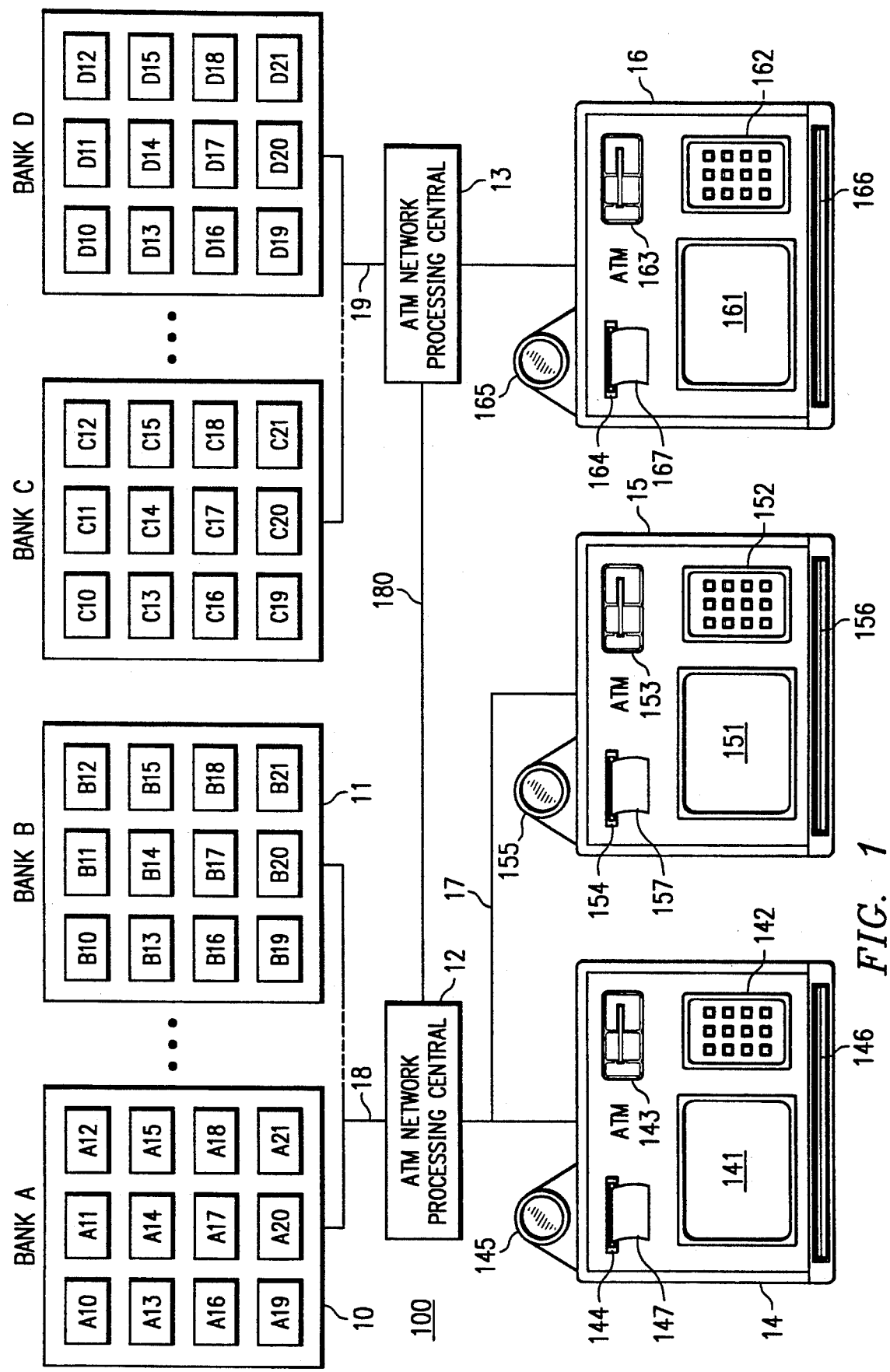
FIG. 1 shows in block diagram form an ATM system of the type contemplated by the invention.

FIG. 1 shows a block diagram of ATM System 100 which will be used for the purpose of describing the operational aspects of the invention. It should be noted that ATM systems are currently in place and are more complex than shown here. There are many such systems in the United States and around the world known by various names. Many of such systems are interconnected so that often a person can go to any ATM machine with an ATM card which has been issued by one system and find that the ATM machine can process cards associated with many different systems.

For the purpose of our discussion, an ATM card is one which typically has a magnetic stripe thereon and, which contains a number of fields having information prerecorded therein. The data recorded on the ATM card identifies the system, and the user, and provides other information. System 100 depicted in FIG. 1 comprises several automatic teller machines, such as ATM 14 and ATM 15 connected to ATM Network Processing Central 12. Central 12 could be an existing system, such as the well-known PULSE ATM system currently existing and which is hereby incorporated by reference herein. The ATM system uses, in some embodiments, a mainframe computer running control programs which are not shown, but which are also well-known to those skilled in the art and are incorporated herein by reference.

ATM 16 is connected to ATM Network Processing Central 13, which can be a separate existing ATM control system. The systems could be linked by communication ! ink 180 if necessary. ATMs 14 and 15 are shown connected together by bus 17, which in turn is connected over telephone wires, or microwave relays, to ATM Network Processing Central 12. Of course, ATMs 14 and 15 could each be connected individually to Network Central 12. Bus 17 serves to transmit data back and forth between ATM Central 12 and ATMs 14 and 15 while ATM Central 13 serves to process information back and forth to ATM 16. Of course, any number of ATMs can be connected to either Network 12 or 13 and this invention will function regardless of whether there is one, two or more ATM Network Processing Centrals.

Each ATM, such as ATM 14, typically includes screen 141, keypad 142, slot 143 for reception of the ATM card, printer 144 for printing receipts, 147 camera, 145 (optional) for taking pictures of ATM users and currency (or stored data) dispenser 146. Contained within the ATM machine is a control system which controls the ATM machine. These ATM machines can be, for example, a fourth generation NCR terminal or a Diebold terminal.

In order to avoid undue complexity and length of this patent, and because they are well-known to those skilled in the art, the operational aspects of ATM Network Processing Control 12 and ATM 142 will not be fully detailed herein except that flow charts will be discussed which relate to areas where changes to the standard system must be made.

For a more detailed analysis, and particularly an analysis of the fields contained on the magnetic stripe of the ATM card and of the communication modes between ATM 14 and ATM Central 12, the reader is referred to NCR Programmer's Overview No. D1-2485-A entitled "NDC Plus Programmer's Overview"; and to NCR Publication D1-2486-A entitled "NDC Plus Programmer's Reference Manual"; and to NCR Publication D1-2487-A entitled "Supervisor's Reference Manual." These publications are available to the public from NCR Corporation, 1700 S. Patterson Boulevard, Dayton, Ohio. These publications are hereby incorporated by reference herein.

Continuing in FIG. 1, ATM Network Central 12 is connected via linkage 18 to databases containing account information, such as database 10 and database 11.

In our simplified block diagram, database 10 could pertain to bank A's information while database 11 could pertain to bank B's information. Contained within each database are accounts, such as accounts A10 through A21, of database 10.

In the block diagram of FIG. 1, ATM Network Processing Central 13 is connected via linkage 19 to databases pertaining to bank C and bank D. It will be assumed for purposes of this discussion that banks and customers have methods of establishing accounts and placing money within these accounts and that proper accounting procedures are in place to track the various transactions, all of which are standard in the industry and are well known to those skilled in the art.

FIG. 7 shows deposit card 70 (which could be an ATM card) having contained thereon magnetic stripe 71 which can have preprogrammed into it a fixed amount of, for example, $50.00. This amount can, of course, be any amount and as will be seen and can be an amount that is either preprogrammed at the factory or placed onto a card by a machine, such as machine 1601 (FIG. 16) activated by a clerk in a store, as will be discussed hereinafter.

FIG. 8 shows withdrawal card 80 with magnetic stripe 81 contained thereon. This card, as will be seen, can be used by anyone to remove currency from the ATM network by the use of a temporary PIN in the manner to be discussed hereinafter.

Returning to FIG. 1, the operation of the system in one embodiment is such that a person desiring to establish a temporary withdrawal amount within the system would obtain deposit card 70 from a dealer by the payment of money or by charging the amount of the card to an established source. As discussed, card 70 can be preprogrammed for $50.00 or a clerk at a machine can program onto the card any amount of money as determined by the depositor.

Once the depositor has in his or her possession one or more deposit cards 70, that person (depositor) then inserts the card into slot 143 of ATM 14. The ATM system, as will be seen, reads the card, determines from magnetic stripe 71 that this is a "sponsored" card and not a normal ATM card. The system then can assign a PIN number, which can be made up of multiple parts, some parts assigned by the ATM system and some parts assigned by the depositor, if desired. This assignment of a PIN number can be, for example, cooperatively determined via the use of screen 141 and keypad 142 for communications back and forth between the ATM system and the depositor.

If a system is used having fixed amount cards, a number of such cards can be linked together and accepted by the system so that the depositor is able to transfer multiples of, say, $50.00. When the system establishes the total amount that the depositor wishes to establish the transaction is ended by printing on receipt 147, via printer 144, the amount that has been deposited, together with the temporary PIN number.

The depositor then communicates, in whatever fashion he or she desires, to another person (recipient) the PIN number and the amount so deposited or credited. The recipient then approaches any ATM machine in the network and obtains, perhaps from a merchant, withdrawal card 80 (FIG. 8). The merchant can sell the card for a fixed amount or the card can be delivered free as a service of the merchant. Contained on magnetic stripe 81 of withdrawal card 80 is information pertaining to the sponsor account.

In one embodiment, the information on withdrawal Card 80 must match the sponsor identification information which was contained on deposit card 70. In this embodiment, it is important for the withdrawal party to know exactly which sponsor is being utilized so that the proper card can be obtained.

The withdrawing party then inserts card 80 into any ATM machine, such as ATM machine 15 (FIG. 1) located at a location remote from ATM machine 14. This remote location could be in another state or perhaps even in another country.

In response to the normal prompts, the withdrawing party enters, via keypad 152, the PIN number communicated from the depositing party. The system, as will be seen, then processes the information and verifies the account number by sending the information to ATM Network Processing Central 12, which then in turn directs the information to database 10 of sponsor account A10. This sponsor account is the same sponsor account that was identified by deposit card 70 since the depositor and the withdrawer both dealt with a card issued by the same sponsor A10.

After verification of the PIN number, as reported back from account A10 as will be discussed, the withdrawer keys in the amount desired. If the amount is less than or equal to the amount in the sub-account, ATM machine 15, via currency dispenser 156, provides the currency requested. As will be discussed, withdrawal card 80 is then invalidated, or returned to the withdrawing party, depending upon the design of the system.

Turning now to FIG. 2, it will be seen that each sponsor account, such as sponsor account A10, has any number of sub-accounts, such as subaccounts PIN 00 to PIN XX. Contained within the database, as identified at each PIN location, is the amount that is associated with that sub-account, plus, if desired, additional information, such as a portion of the sub-account password. This additional portion of the password is passed back to the ATM machine in response to the insertion of card 80 and, as will be seen, is used for identification of the proper recipient.

In operation, since the money is deposited (a credit established), via the deposit card in one city and can be withdrawn from another city, there is an accounting function which must take place. This accounting function is typical for interbank transfers with the difference being that the actual amount in sponsor account A10 is maintained by the sponsor and not by the depositor or withdrawer. Thus, periodically the balances must be summed from all of the sub-accounts to arrive at a total amount which must be in sponsor account A10. This money can be deposited in the traditional manner via bank transfers so that the sponsor can maintain the total account either greater than the sum of the accounts or just equal thereto. Also systems can be arranged where at the end of each day the amount of activity in the account is totalled and a charge is automatically made against a separate account maintained by the sponsor.

From the bank's perspective, each sponsor account appears to be a single account even though, in reality, many different people use the same sponsor account. Thus, using this system, many different individuals may deposit and withdraw money from a single account from time to time and these individuals need not be known or identified prior to being able to access the account. Of course, the use of sub-accounts is for conceptual purposes only and in actual practices these would be data entries and look-up tables established in a master data base within a computer (not shown). The data base would then communicate with a bank on a periodic basis in order to "balance" the various amounts.

One alternate method of using the system would be for various banks or other entities to issue special "money" cards that they sell through retail outlets in stores around the country or around the world. In such a situation, the bank would serve as the "sponsor" and would maintain its own sponsor account. The system would work such that the sponsor bank would have printed on the magnetic stripe of the money cards an electronic designation of the bank and a designation of a particular account within that bank. Again, these cards (assuming a fixed value of say $50) would be sold at a premium, for example $55.00, to a potential depositor.

This system is envisioned such that a depositor in one city can place money in the sponsor account by inserting the money card in an ATM and have a recipient at another city withdraw that money. The system will also work for travelers who wish to deposit a large sum of money in an account locally where they live and then withdraw the money as they go, perhaps in the currency of a country foreign to that in which the deposit (transfer) is made. Today the ATM network is used in this manner by people who maintain regular accounts, but there are a vast number of people who do not choose, for one reason or another, to maintain an ongoing account and thus do not have access to the ATM system. Also, today, ATM systems take several days to become active and require a great deal of bookkeeping by the banks. The system described herein gives immediate access with no paper work.

Figure 9:
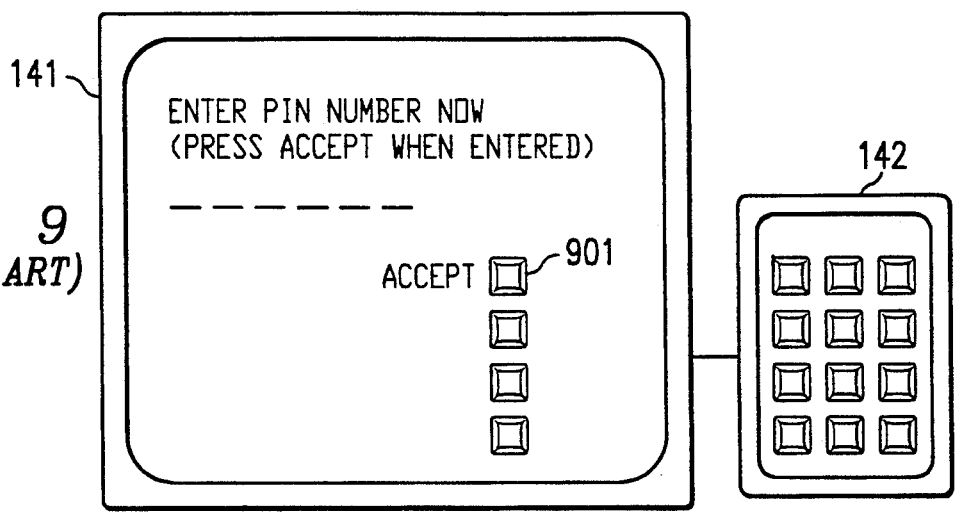
FIG. 9 shows prior art ATM screen used for communicating with a ATM user.

Before discussing actual system operation, it might be helpful to review the typical transaction with respect to a customer as seen from the screen of the ATM machine. In FIG. 9, the system shows screen 141 of an ATM machine used in prior art systems where, after insertion of the ATM card, the system instructs the user to enter his/her PIN number via keypad 142. When the full PIN number has been inserted the user then is instructed to push accept key 901. The system then functions as well-known in the art, by continuing to ask the customer a series of questions. These questions include inquiries as to the transaction type the customer desires, what account the money should be taken from and ultimately an inquiry is made as to the amount. All of this interchange is accomplished with key pad 142 and soft keys 901. During a typical sequence of events, money is dispensed or a deposit is made via an envelope being placed in a slot. The customer is finally asked, via screen 141, whether he/she desires another transaction. In response to a "no" from the user the ATM card is then returned to the user.

Figure 10:
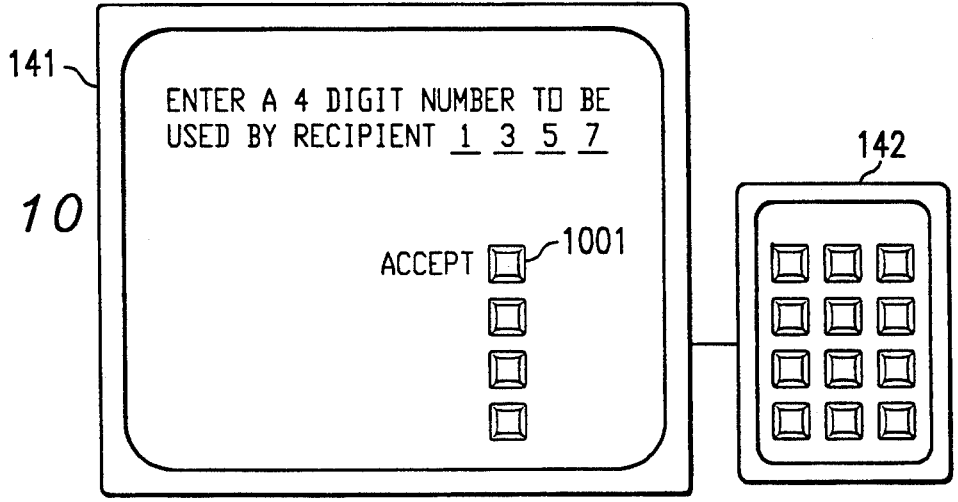
FIGS. 10 through 15 show ATM screens used for communicating with the user in a system described herein.

In the system described in this invention, as depicted in FIG. 10, the user inserts the "bought" (sponsor) temporary ATM card which has on it (on its magnetic stripe) data corresponding to the sponsor account. In our example we will assume this account to be 5555 (sponsor Account A10).

The system then goes to the database associated with account 555 (A10) and finds an available subaccount, such as subaccount PIN XX.

Figure 11:
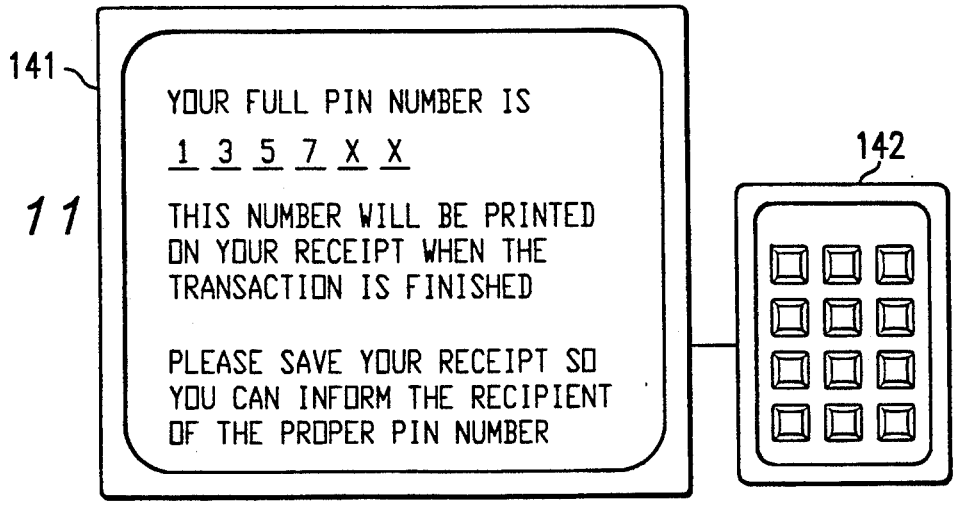

The system then asks the depositor to establish a four digit number to be used by the recipient as a PIN or password. Note, of course, the system could assign the full PIN number if desired. In our example, the user inputs 1357 via keypad 142. This number is then displayed on screen 141 for verification. When this is accepted, the user presses key 1001, and, as shown in FIG. 11, screen 141 then responds by giving the user the full PIN number; which in this case is 1357XX and instructs the user that this number will be printed on the receipt when the transaction is finished. The "XX" portion of the PIN number is the sub-account number within sponsor account 5555 (account A10 of FIG. 2).

In one scenario, where the amount of money is preprinted on the card, the depositing user need do nothing more unless several cards are to be linked to establish an amount greater than that posted on a single card. The user then would be asked if there are additional cards, and in response to a "yes" answer, is instructed to insert these additional cards, one at a time, under control of screen prompts.

When the transaction is finished the screen would then display the amount deposited and ask for verification. This "deposited" amount is then transmitted to the central ATM network as a credit to sub-account XX of account 5555 (A10 of FIG. 2) and the user is given a receipt which has printed on it the amount deposited in the account and the PIN number of the account. The user may also be provided other information pertaining to the type of system used or the user can be directed to certain commercial facilities where withdrawal cards associated with the same system i.e., the same sponsor account, are available.

For example, one chain of gasoline stations may have an account available from stations across the country and their account number could be 1234, while a convenience store chain could have a different sponsor number such as 1235. A user need not know the specific account number, but only need know the identity of the system, or the identity of the sponsoring agency, such as the "Octane" gasoline company or the "Super Fast" store company.

Figure 12:
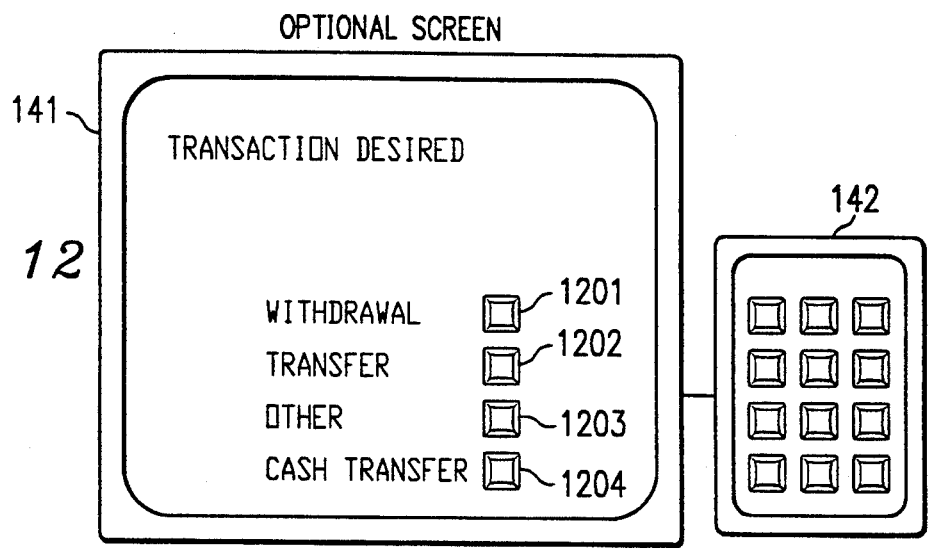

FIG. 12 shows an optional screen designed for systems which provide for transferring money from an established ATM account to a temporary account or for allowing temporary access by another person to the existing account for the purpose of withdrawing a preestablished, but variable, amount from that account. In this situation, the user would typically be transferring, or setting aside, money from his/her own account and would not be using the "bought" temporary ATM cards. However, these two types of arrangements could be linked so that either transaction could occur.

Figure 13:
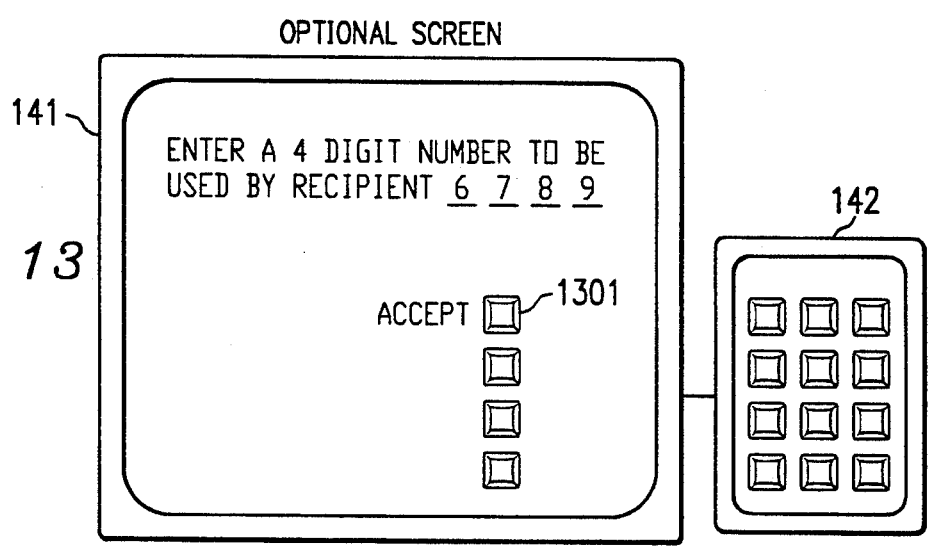

Thus, as shown in FIG. 12, the ATM screen asks for the type of transaction desired. In this case, the user would press button 1204 opposite "cash transfer". Upon pressing key 1204 the screen would, as shown in FIG. 13, instruct the user to enter a 4 digit PIN number to be used by the recipient as discussed above with respect to FIG. 11. In this case the user inputs the code 6789 and presses accept button 1301.

Figure 14:
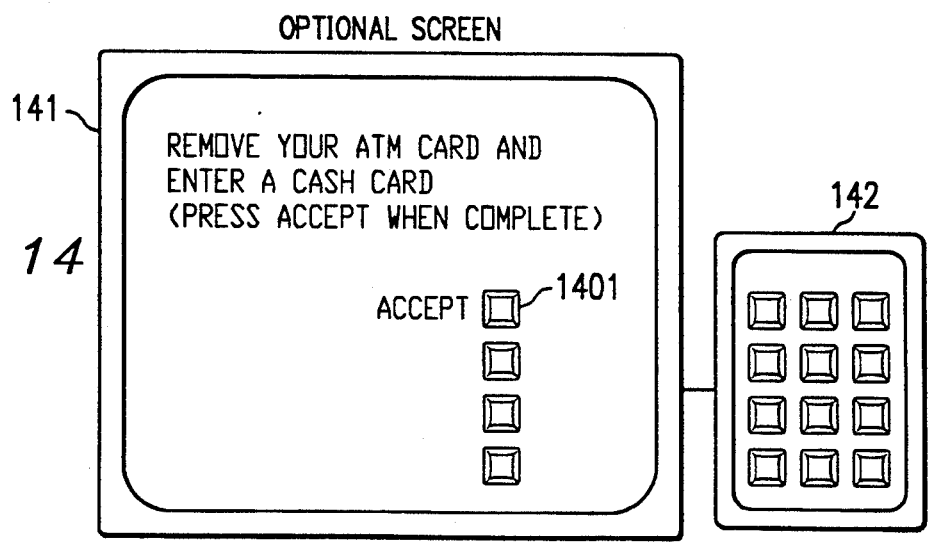
Figure 15:
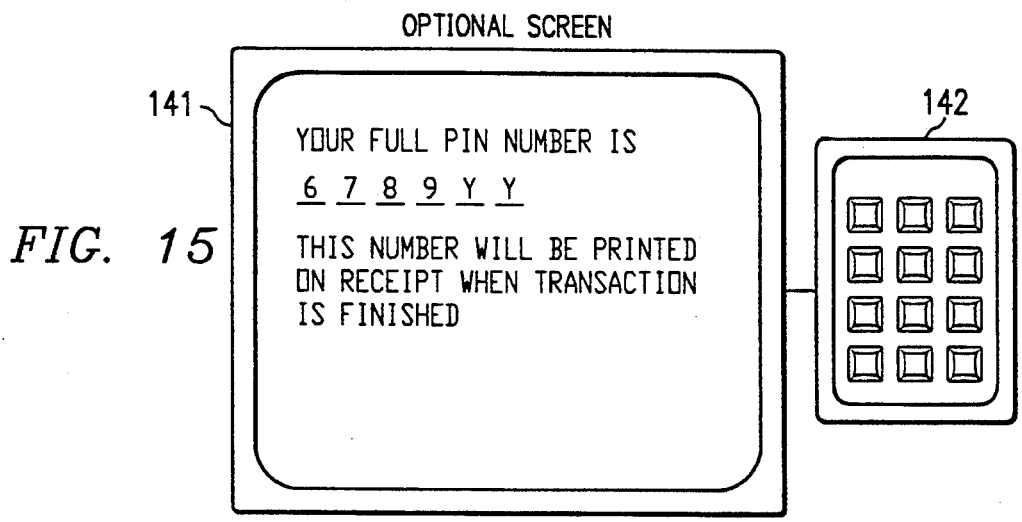

The screen then switches to that shown in FIG. 14 and one scenario where the user is asked to remove the ATM card and enter a cash (sponsor) card containing the sponsor's identity. When the preprinted card system is used, the sponsor account is preprinted on the temporary ATM card and button 1401 is pressed. As shown in FIG. 15, the full PIN number is 6789YY with YY being the sub-account assigned for this transaction.

Of course, the system could be designed to ask the user to identify either a sponsor account from a list of accounts or the user may be asked to provide a code number pertaining to a system from a list of code numbers, either supplied by the ATM screen or supplied by external advertising. One important aspect is that the account need not be the user's own account.

In another embodiment, however, it is possible to design the system such that any user who has a preestablished ATM account can allow anyone anywhere in the world to withdraw a certain prefixed amount from that account. The withdrawing party would not have access to the full account, but would be limited to an established amount. Under such a scenario, the depositor would then simply designate his/her own account as the sponsoring account and the subaccount (credit limit in the database) would be established.

This information, of course, would have to be communicated to the recipient so that upon the proper commands during the withdrawal phase the bank associated with the first depositor's account is identified. Again, this identification can be preknown to the depositor or recipient or it can be printed on the receipt by the ATM machine in response to a series of inquiries by the ATM system. These aspects of the system are not shown in detail but rather are straightforward to implement once the concept has been discussed and understood by those skilled in the art. The number of system formulations and possibilities and system options is limitless and would burden this specification unduly to enumerate all of them or to attempt to provide the actual programming herein.

Returning now to FIG. 3, for a specific operation the user inserts a "bought" card, as discussed above, into the ATM machine which generates a card insert signal 300 which is equivalent to the good read signal currently utilized. Box 301 determines if this is a valid sponsor card. If it is not, then the system reverts to the conventional state flow processing which typically would be the PIN entry state in the above referenced NCR plus system. Whether or not this is a sponsor card can be determined by reading the FIT field or any other field on the card's magnetic stripe.

Digressing momentarily, the PIN number could be determined at the point of sale of the card such that the clerk who inputs the amount of money into the card can then give an oral PIN number to the user. Alternatively, the clerk could pass the card through an electronic printer and encode the temporary PIN number onto the card. This electronic printer could be connected to the central computer network if desired.

Figure 3:
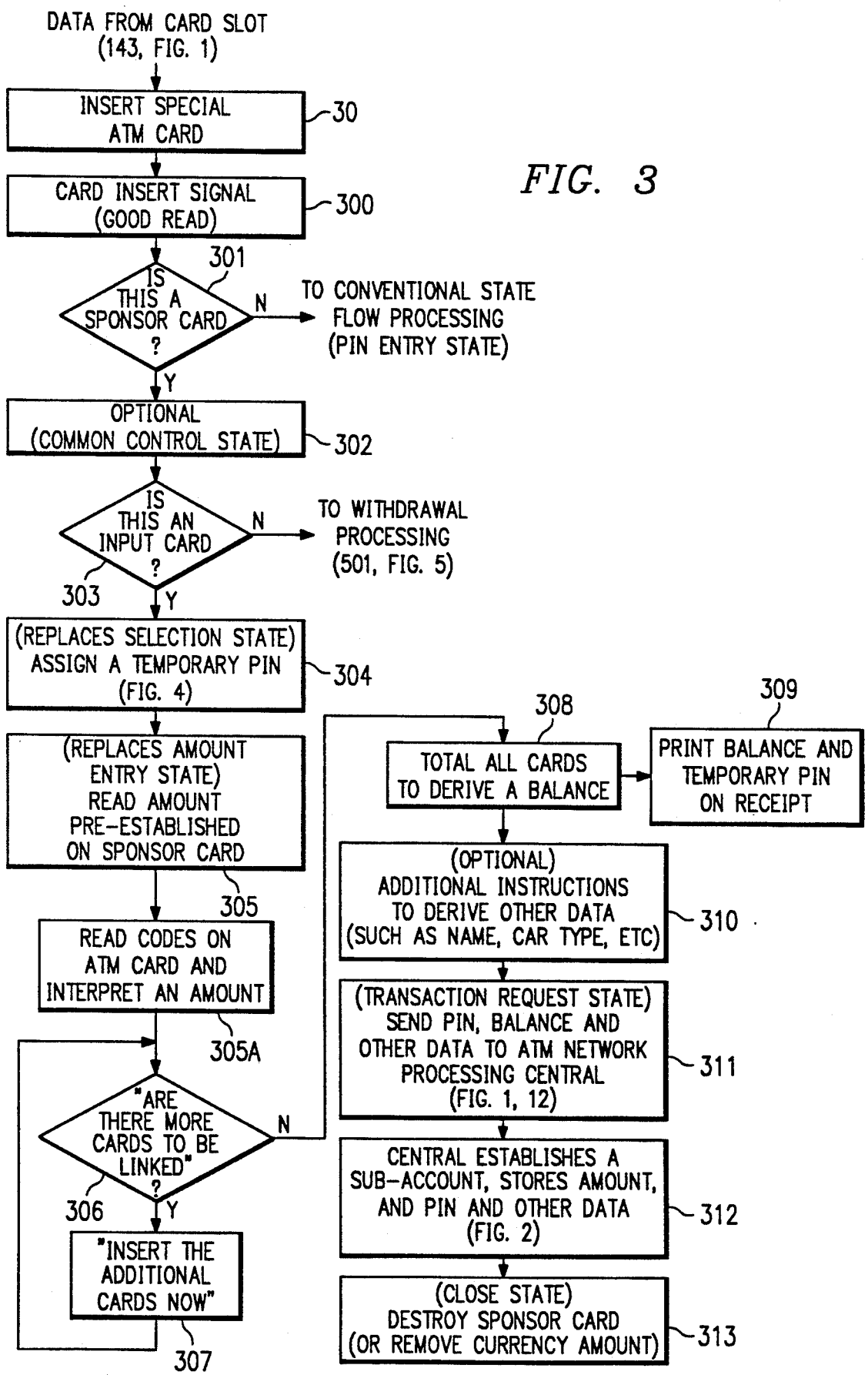
FIG. 3 is a flow chart of the typical modifications necessary to the ATM control for a system to function in the manner described in this invention.

Continuing in FIG. 3, the system then goes through the optional common control state 302 and enters into box 303 which determines if this is an input card or a withdrawal card. If it is a withdrawal card, then control is transferred to FIG. 5 which will be discussed hereinafter.

Assuming now that this is an input card, box 304 assigns a temporary PIN number as will be discussed with respect to FIG. 4. This effectively replaces the selection state of a typical NCR plus system.

As shown in FIG. 4, box 401 displays a request to the user to provide a temporary PIN such as, for example, a 4 digit number. Box 402 then adds its own PIN suffix (or prefix) depending upon the identification of the sponsor account and sub-account. As discussed previously, this can be obtained from the magnetic stripe of the temporary card or can be obtained by input from the user or it can be obtained from the identity of the ATM machine which can be preprogrammed internally. Control 403 then displays to the user the full PIN number.

As discussed, this number has two parts, PIN I and PIN 2. PIN I would be the number that the user inputted. PIN II would be the portion identifying the sponsor sub-account and perhaps the account.

As will be seen hereinafter, the PIN II portion of the PIN number is utilized to identify the subaccount (database location) within the sponsor account (database) and is thus placed into a database table at the central control and acts, as will be seen, as a pointer to the proper subaccount under control of information inputted by a withdrawing user. This could be subaccount PIN XX as shown in FIG. 2.

It should be noted that the depositing user can establish his/her own Part II PIN subaccount number. However, in this situation it is possible for the same sponsor account to have two different users concurrently attempting to establish the same PIN number. This can be handled either by asking the customer to supply another PIN number or by an automatic modification of the number dependent upon the time of day and the location of the ATM machine or upon any other set of unique parameters. Such a modification need not even be communicated to the user but can be stored in the database. The PIN number that is printed for the user on the receipt could very well include code numbers indicative of the time, location, etc. so that the full identification number would be unique to that user.

Returning now to FIG. 3, box 305 reads the amount pre-established on the sponsor's card. This state replaces the "amount entry state" of the NCR plus system. Box 306 asks the user whether there are more cards to be linked and if the answer is yes the user is instructed via box 307 to insert additional cards. This then loops until the user answers "no", in which case box 308 totals the input to determine a BALANCE and prepares to print via box 309 the balance and the temporary PIN number on the receipt.

If desired, box 310 asks the user for additional information to derive additional data which can be the name of either the depositor or the recipient, a city, an address or something particularly unique, perhaps a birthday, so that if the receipt is inadvertently discarded an unauthorized person cannot use the system. This additional information will be well-known to the withdrawing person.

Digressing again momentarily, it should be understood that it is not necessary to print the PIN number on the receipt. This is done only to make this system universally acceptable to all people. Because the system relies upon the passing of PINs or keys, from one person to another it is preferable that this number be one that is written down so that people will not be required to remember a code and will not become frightened about losing their money in a system if they forget the code. Thus, providing the full PIN information to the depositing user is simply a user friendly alternative and need not be actuated if so desired.

However, in one form or another the depositor must provide a unique PIN number to a withdrawing party and this PIN number must be one which is easy to transmit orally without interception by unauthorized parties. Thus, if a mother were transmitting money for use by a son at a distant location the mother might, for example, say to the son over the telephone "you may withdraw $200 using the ATM located at a certain specific brand name gasoline station anywhere in the country using PIN number 6789 and your birthdate". Since the mother need not transmit the birthday information on the open telephone an interceptor will not be able to gain access to the temporary account. (In this scenario, the mother would be well advised not to use her own birthdate to avoid embarrassment by a forgetful son.) Of course any number of methods can be devised to make the system more secure as desired.

Returning to FIG. 3, after all of the data is gathered, box 311 sends it to network processing central 12 (FIG. 1). This state would typically be the transaction request state of the NCR plus system. As discussed above, at the central system there is established a subaccount within the sponsor's account and the amount is stored therein as a credit. Also stored is the temporary PIN and the other data, via box 312. Box 313 either destroys the sponsor card or removes the currency amount from the card, or in the case of an existing ATM card, returns the permanent ATM card to the user. This is known as the close state in the NCR plus system.

Figure 5:
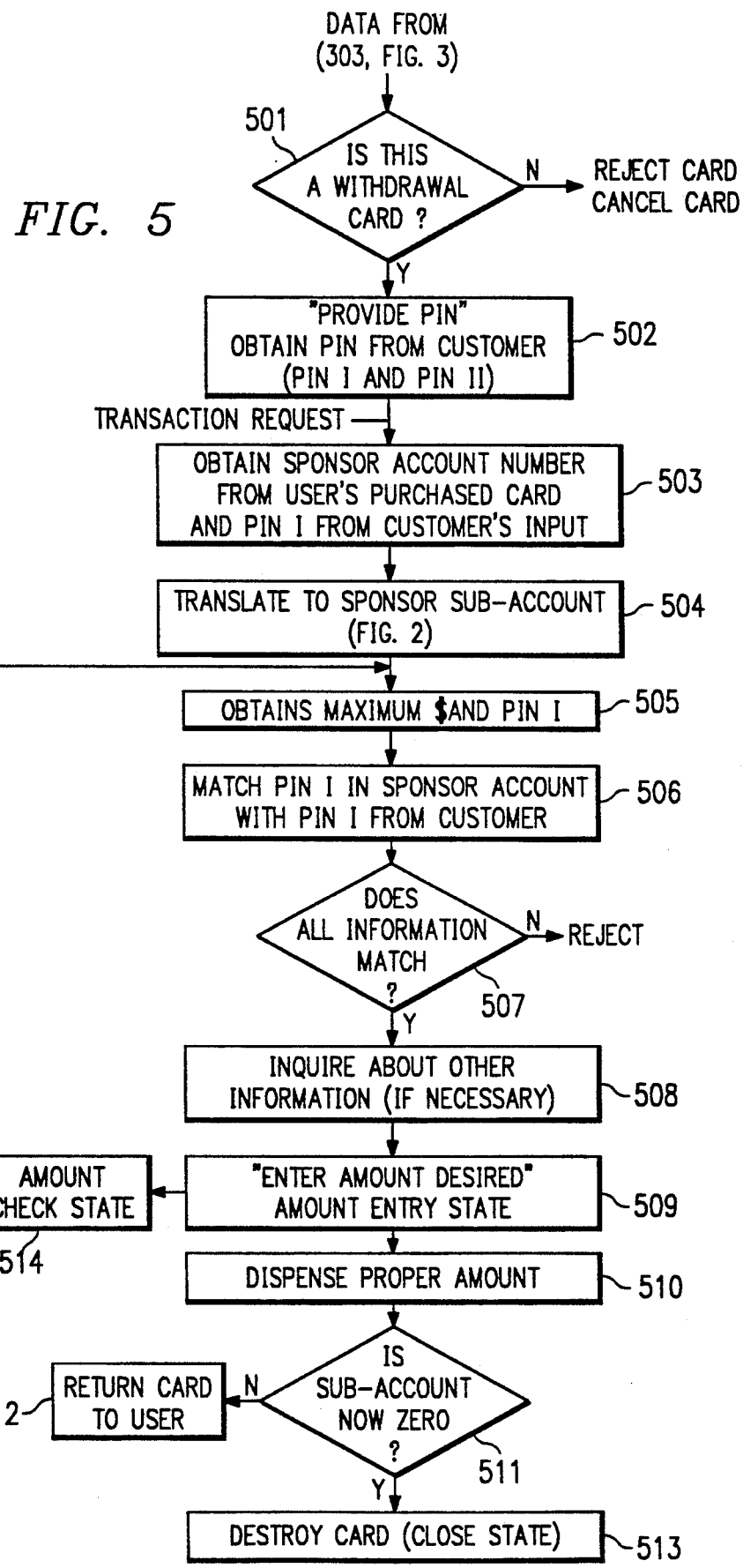
FIG. 5 is a flow chart showing the typical modifications necessary to the ATM control for withdrawing by using a temporary PIN.

Turning now to FIG. 5, we will discuss the sequence of events that occurs if this is a withdrawal transaction. Data is received, for example from box 301 FIG. 3, and the system, via box 501, checks to see if this a withdrawal card. If it is not, the system either cancels the card, stores it internally, or rejects the card. If this is a valid withdrawal card, then box 502 asks the user to provide the PIN number which is both PIN I and PIN II as obtained from the depositing party. This is roughly equivalent to the transaction request of the existing system.

Box 503 then obtains the sponsor account number from the magnetic stripe on the temporary ATM card purchased by the recipient. This sponsor account can optionally be obtained directly from the ATM machine if the machine is dedicated to a particular sponsor. The account can also, if desired, be obtained from the PIN information provided by the withdrawing user.

The PIN II portion of this information is translated via box 504, which could be either locally or at the central processing system, into a sponsor's account and subaccount number. The subaccount number (PIN II) is used to identify a particular subaccount or database within the sponsor's account.

The information stored at that subaccount location is obtained via box 505. This information includes the maximum dollar amount that can be withdrawn, together with the PIN I information number which will be used to match up against the information number provided by the recipient. The PIN 1 number could also contain some portion of the other data information which is unique to the withdrawing party.

Box 506 then matches the PIN information provided by the recipient from the information withdrawn from the identified subaccount. Box 507 determines whether or not a match exists and box 508 inquires about other information, if necessary, such as name, birth date, address, etc. Box 509 is the "amount entry state" from the traditional ATM system where the withdrawing person is asked to enter the amount desired. Once the desired amount is entered, box 514 checks to determine if this amount is available (preestablished) from the particular subaccount.

Note that even though the main account may have more credit in it, this withdrawing user is limited to the amount corresponding to the subaccount, which in turn is controlled by the PIN number. This is the feature which allows a user to provide access to his/her own account by some other person and without subjecting the account's entire balance to improper withdrawal.

The ATM, via box 510, is then instructed to dispense the proper amount and in box 511 a check is made to see if the subaccount is now zero or whether or not there is credit remaining in the subaccount for subsequent withdrawal. If the credit limit is zero, the card can be destroyed. If there is more credit remaining, then the card can be returned to the user controlled by box 513.

FIG. 6 shows a modification of the typical transaction of an ATM system using the NCR plus system. Box 60 accepts the normal ATM card as inserted by the typical user. Box 602 is normal protocol for such a system; box 603 controls a screen which displays the various services which the user might wish to avail him/herself of.

Assume that the user asks for the "Cash Transfer" service. In this event, a temporary PIN number is assigned which can be a combination of information contained on the ATM card; unique information such as date, time, location, and interactions from the user. The user, via box 605, is asked to enter the amount to transfer (or the amount to be designated for withdrawal by the user having a temporary PIN). Box 606 prints the balance and the temporary PIN number on the receipt. Box 607 sends the PIN and balance to the network processing central, FIG. 1. Box 608 returns the ATM card and box 609 controls the establishment at the central location of the subaccount (database and established limits) within the sponsoring account and stores the credit amount and the temporary PIN number which, as discussed above, will be matched by the withdrawing party.

Figure 16:
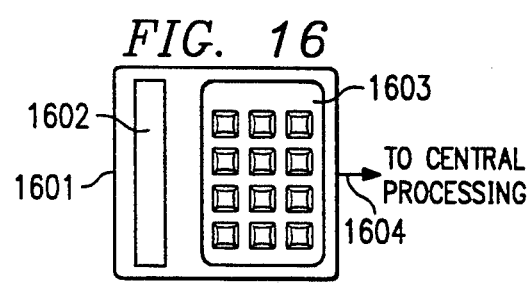
FIG. 16 shows a machine for adding value to a temporary ATM card.

FIG. 7 shows deposit card 70 with a preestablished dollar amount (say $50) imprinted on magnetic stripe 71. This stripe could have on it a prerecorded bank identification number and could even have a subaccount prerecorded. Alternatively, the subaccount number can be generated as discussed previously from unique circumstances at the time of the transaction. Some portion of the PIN number can be prerecorded or can be created from a combination of circumstances at the time of the transaction. This subaccount number can also be established by the central processing system at the time of the transaction and can be either imprinted on the card at the ATM machine, or alternatively, can be imprinted on the card by a operator working at a machine, such as machine 1601 (FIG. 16). In such a situation the operator would insert a blank temporary ATM card via insert portion 1602 (FIG. 16) and then would keypunch via keys 1603 various amounts onto the card. Thus, if the person wanted $300 installed on the card, the operator would then input $300 to the card and could then add other information such as the account and subaccount.

Machine 1601 could be connected via telephone wires 1604 or microwave relay (not shown) to the central processing system which would then provide data which is representative of the account, subaccount and other necessary information. Under this arrangement, when the user inserts the temporary card in the ATM, the information is already on the card and the account could have already been established. This operation can be via machine separate from the ATM machine or by a process internal to the ATM system.

FIG. 8 shows a typical withdrawal card 80 which includes magnetic stripe 81. This card can be a card which has precoded on magnetic stripe 81 the sponsor account number. The withdrawal card can be purchased at a participating sponsoring agency, such as a station of the national gasoline company sponsoring the card and under one scenario the PIN number can be told to an operator who can then use machine 1601 (FIG. 16) to input the proper PIN and subaccount numbers. Alternatively, this information can be established as discussed previously with respect to FIG. 5 by the user working directly at the ATM machine.

Utilizing this system, a withdrawing person need not have a preestablished ATM card nor a preestablished bank account but could, by obtaining a temporary withdrawal card 80 at various locations, obtain funds set aside in an existing account. Thus, this system can be used to transfer money around the world on a moment's notice to people who may or may not have other accounts, thereby making cash instantly available for people who are traveling or even for people who are paying bills from remote locations.

Certainly it is possible to use the system for borrowing money where the depositing person makes arrangements with a local credit agency to allow for the establishment of an account and for the availability of certain amounts at certain times. By using this system, money can be transferred from one person to another instantaneously without the creation of paper and without the time delay necessary to move the currency physically from one place to another.

The system can be designed so that only certain amounts can be removed on any one day and those well skilled in the art may devise many alternatives and security systems to make the system more practical in its every day operation, always keeping in mind that if the system is to be used by many people it must be user friendly and easy to use by those who might otherwise have difficulty remembering or keeping track of data and instructions.

Figure 17:
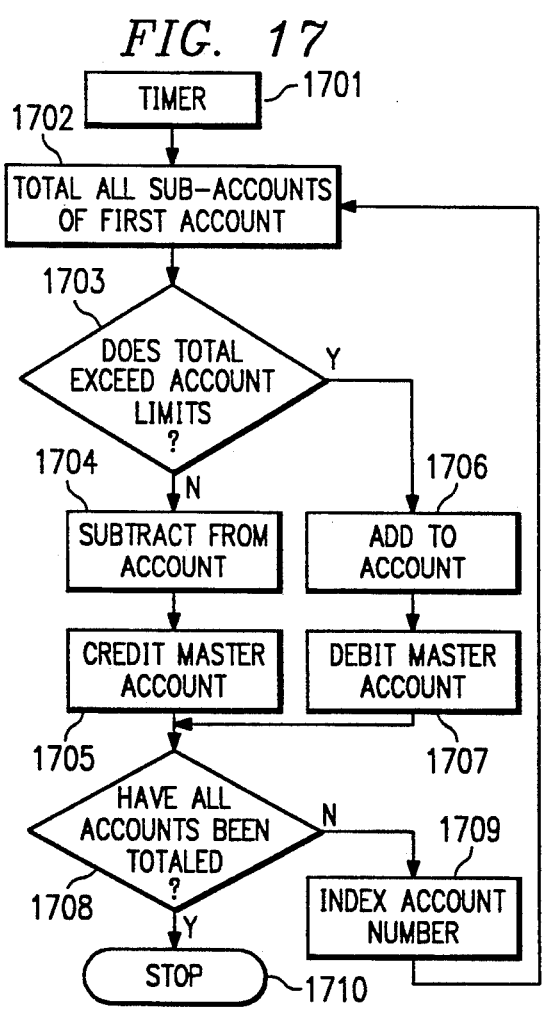
FIG. 17 shows a flow chart for controlling the accounting functions necessary for maintaining proper balances in the master account.

FIG. 17 shows a flow chart for a system of settling accounts such that the subaccounts of a master account are totalled on a periodic basis, perhaps once a day. Based on the totaling amounts funds are either transferred into or out of the sponsor account. The primary reason for such a totalling is that the system is being used by a sponsor who collects money from depositors at one location for subsequent withdrawals at another location. Thus, the credits in the subaccounts are subject to withdrawal and are constantly fluctuating. It is important to periodically check the balances and transfer money into the account from another account so that the system is maintained in a balanced format.

As shown on FIG. 17, timer, via box 1701, is set to trigger periodically at whatever interval the sponsor (and the bank) feel comfortable. Box 1702 totals all the subaccounts of a particular account, say, for example, account A10. Box 1703 checks to see if the total calculated from all of the subaccounts exceeds the actual balance of that account. If the answer is no, then box 1704 optionally subtracts the excess from the account and box 1705 credits the excess to another master account.

If the total in the subaccounts of the account does exceed the balance, then money (credit) must be added to the sponsor account from a master account. This is handled by boxes 1706 and 1707.

At the end of this routine, box 1708 checks to see if all accounts at a particular bank corresponding to this sponsor have been totalled. If they have not, then box 1709 indexes the accounts and the procedure is repeated. If all of the accounts have been totalled, then the routine ends via box 1710.

Figure 18:
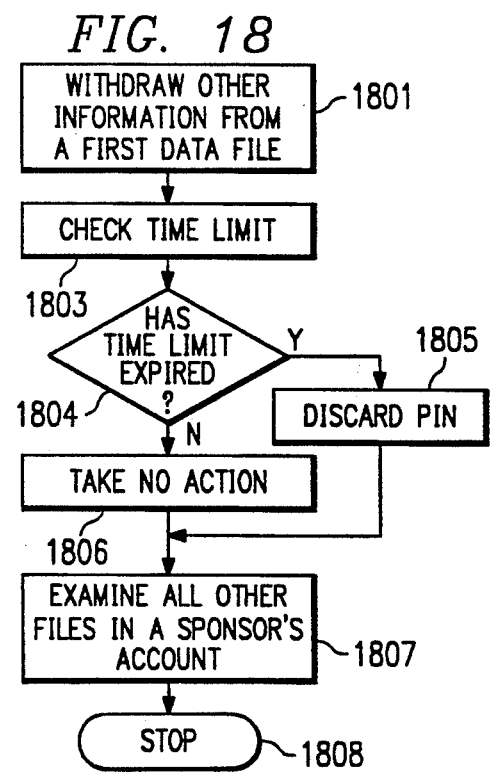
FIG. 18 is a flow chart showing automatic expiration of a temporary PIN.

In FIG. 18, boxes 1801-1808 show a procedure for checking time limits on subaccounts and for removing permissions and limits after time has expired. This supposes that a time limit is either entered by the creating user or by the system automatically when the temporary PIN is first created.

Although the present invention and its advantages have been described in detail with respect to one type of system, it should be understood that various changes, substitutions and alterations can be made herein without departing from the spirit and scope of the invention as defined by the appended claims.

While the invention has been set in an ATM system it should be understood that the inventive concepts are usable in any type of electronic transfer system where something of value is to be moved from one person to another without the preexistence of an account for at least one of the parties. In the embodiment described the commodity being transferred is currency, or to be more precise, the commodity is a credit in an account. The commodity could be electronic messages, legal title information, images, instructions facsimile, or cryptographic keys, all of which would be within the spirit and scope of this invention. Also note that in the embodiment described, when the system solicits identification information from the user, that user manually inputs the response. However, the response, which is used to create the unique identification code, including the account number and the subaccount number, could be electronically created without the user's active input.

What is claimed is:

1. A system for currency management between a depositing user and a recipient user using an electronic funds retrieval system, said retrieval system having associated therewith a plurality of input devices for accepting user information, said management system comprising:
   means for accepting from a depositing user at one of said input devices an amount of currency to be available for withdrawal;
   means for creating a unique temporary identification number and for associating said unique identification number with said accepted available withdrawal amount; and
   means for associating said unique identification number and said accepted available withdrawal amount with a particular account in said system accessible via any of said input devices associated with said system.

2. The system set forth in claim 1 further comprising:
   means for accepting at any of said input devices from a withdrawing user at least a portion of said unique identification number and an amount to be withdrawn; and
   means controlled in part by said accepted unique identification number from said withdrawing user for limiting the amount of currency that can be withdrawn from said particular account by said withdrawing user to an amount equal to or less than said associated accepted available withdrawal amount.

3. The system set forth in claim 1 wherein said particular account contains a plurality of said associations each having a different one of said unique identification numbers associated therewith, each said identification number having a specific available withdrawal amount associated therewith.

4. The system set forth in claim 1 wherein said depositing user accepting means includes:
   means separate from said input device for storing in electronic readable format said available withdrawal amount; and
   means within said input device for accepting said stored available withdrawal amount from said storing means.

5. The system set forth in claim 4 wherein the amount stored on said storing means is preknown to said retrieval system upon identification of said storing means.

6. The system set forth in claim 4 wherein said storing means includes:
   means for modifying said electronic readable available transfer amount.

7. The system set forth in claim 4 further comprising:
   means for linking a plurality of said storing means to create an available withdrawal amount equal to the sum of said linked storage means.

8. The system set forth in claim 4 wherein said amount stored in said storing means can be preassigned and wherein said preassigned value is communicated from said storing means to said retrieval system and can be different from time to time.

9. The system set forth in claim 1 wherein said unique temporary identification number creating means includes:
   means for interactive communications between said retrieval system and said depositing user.

10. The system set forth in claim 1 where said depositor accepting means includes:
    means from transferring a selectable amount from one account to another.

11. The system set forth in claim 1 further comprising means for controlling the duration that a particular unique withdrawal amount is available for withdrawal from a particular account.

12. The system set forth in claim 2 wherein said withdrawing user accepting means includes:
    means separate from said input device for storing at least a portion of said unique identification number; and
    means within said input device for accepting said unique identification number from said storing means.

13. The system set forth in claim 12 wherein said unique information storage means and said available withdrawal amount storage means are independent of each other with each containing different information.

14. A method for currency management between a depositing user and a recipient user using an electronic funds retrieval system, said system having associated therewith a plurality of input devices for accepting user information, said method comprising:
    accepting from a depositing user at one of said input devices an amount of currency to be available for withdrawal;
    creating a unique temporary identification number and for associating said unique identification number with said accepted available withdrawal amount;
    communicating said unique temporary identification number to said depositing number; and
    associating said unique identification number and said accepted available withdrawal amount with a particular account in said system accessible via any of said input devices associated with said system.

15. The method set forth in claim 14 further comprising the steps of:
   accepting at any of said input devices from a withdrawing user at least a portion of said unique identification number and an amount to be withdrawn; and
   limiting in part by said accepted unique identification number from said withdrawing user, the amount of currency that can be withdrawn from said particular account by said withdrawing user to an amount equal to or less than said associated accepted available withdrawal amount.

16. The method set forth in claim 14 wherein said particular account contains a plurality of said associations each having a different one of said unique identification numbers associated therewith, each said identification number having a specific available withdrawal amount associated therewith.

17. The method set forth in claim 15 wherein said depositing user accepting step includes the steps of:
   storing in a device separate from said input device and in electronic readable format said available withdrawal amount; and
   accepting at said input device any said stored available withdrawal amounts.

18. The method set forth in claim 17 wherein said storing step includes the step of determining said stored amount by said retrieval system upon identification of said separate devices.

19. The system set forth in claim 17 wherein said storing step includes the step of:
   modifying said electronic readable available transfer amount.

20. The method set forth in claim 17 further comprising the step of:
   linking a plurality of amounts stored on said devices to create an available withdrawal amount equal to the sum of said linked storage amounts.

21. The method set forth in claim 17 wherein said amount stored in said device can be preassigned and wherein said preassigned value is communicated from said device to said retrieval system and can be different from time to time.

22. The method set forth in claim 14 wherein said unique temporary identification number creating steps includes the step of:
   interactively communicating between said retrieval system and said depositing user.

23. The method set forth in claim 14 where said accepting step includes the step of:
   transferring a selectable amount from one account to another.

24. The method set forth in claim 14 further comprising the step of:
   controlling the duration that a particular unique withdrawal amount is available for withdrawal from a particular account.

25. The system set forth in claim 1 further comprising means controlled by said management system for communicating said unique temporary identification number to said depositing user.

26. The system set forth in claim 1 wherein said retrieval system is an ATM system and wherein said input devices are remotely located ATM machines.

27. The system set forth in claim 1 wherein said creating means is operating under control of a user at one of said input devices.

28. The system set forth in claim 1 wherein said particular account need not be an account identified with said depositor prior to the enabling of said associating means.

29. The system set forth in claim 28 wherein said associating means is a card containing the identification of said particular account, said card also containing said amount of currency to be transferred.

* * * * *